April 28, 1925. 1,535,538
J. P. MAXFIELD ET AL
VIBRATORY SYSTEM
Filed Jan. 3, 1923
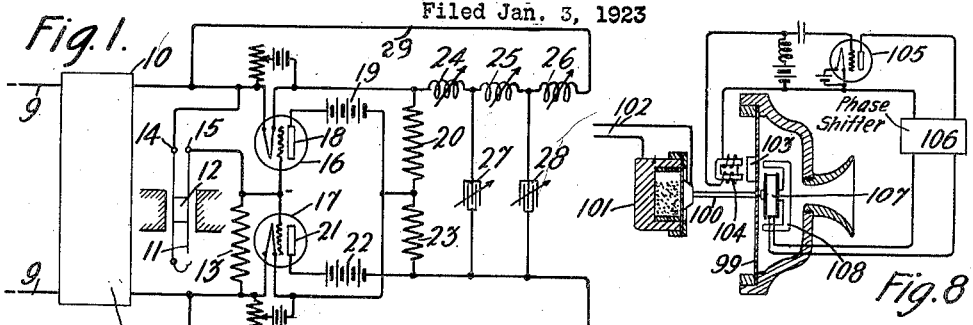
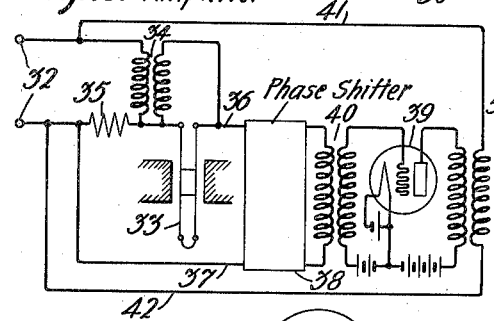
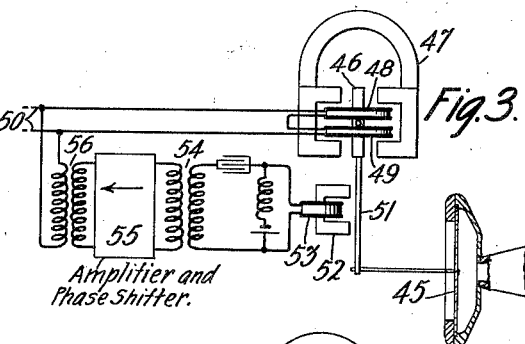
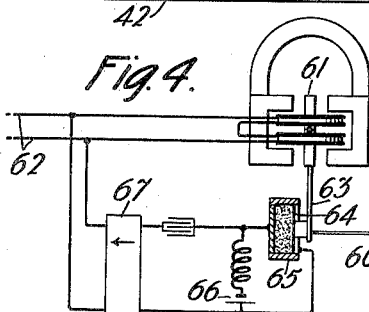
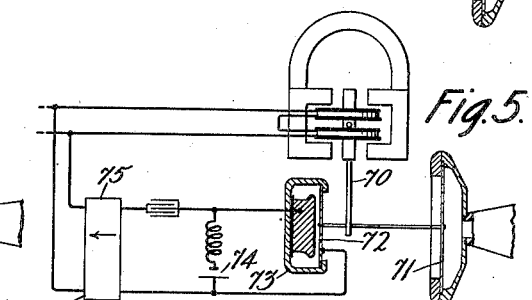
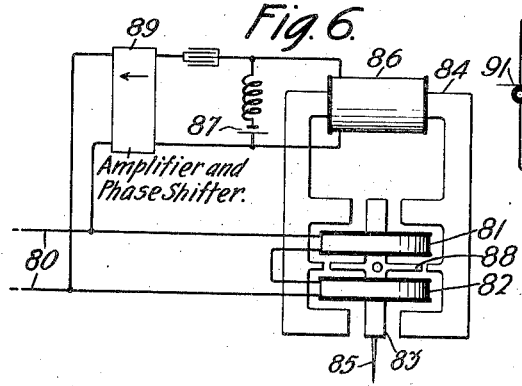
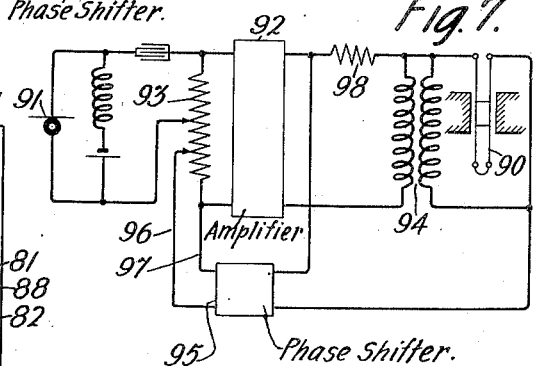
Inventors:
Joseph P. Maxfield
Henry C. Harrison
by [signature] Atty.

Patented Apr. 28, 1925.

1,535,538

UNITED STATES PATENT OFFICE.

JOSEPH P. MAXFIELD, OF MAPLEWOOD, NEW JERSEY, AND HENRY C. HARRISON, OF PORT WASHINGTON, NEW YORK, ASSIGNORS TO WESTERN ELECTRIC COMPANY, INCORPORATED, OF NEW YORK, N. Y., A CORPORATION OF NEW YORK.

VIBRATORY SYSTEM.

Application filed January 3, 1923. Serial No. 610,537.

*To all whom it may concern:*

Be it known that we, JOSEPH P. MAXFIELD and HENRY C. HARRISON, citizens of the United States, residing at Maplewood, in the county of Essex, State of New Jersey, and at Port Washington, in the county of Nassau, State of New York, respectively, have invented new and useful Improvements in Vibratory Systems, of which the following is a full, clear, concise, and exact description.

This invention relates to vibratory systems and more particularly relates to mechanical vibrating systems which are electrically driven.

One object of the invention is to reduce distortion in a vibratory system.

Another object is to provide means and methods for damping the mechanical vibration of a moving system.

The forms of this invention hereinafter described, illustrate how distortion, due to natural resonance effects in various types of vibrating systems, may be avoided by a suitable damping mechanism. Briefly, the damping mechanism provides means for producing electrically, a force proportional to but 180° out of phase with the velocity of the moving system. The generated electromotive force may either be fed back upon the electric circuit producing the vibration of the moving system, or may be made to react by a separate mechanism upon the moving system, with, of course, a force 180° out of phase with the velocity of vibration. Amplifiers of the vacuum tube type, for example, may be utilized in amplifying the electromotive force in controllable amounts, and suitable adjustable phase-shifting networks may be employed for insuring that there is a 180° phase shift for as wide a frequency band as is desired. Referring to the drawings, Fig. 1 discloses this invention applied to the damping of an oscillograph suspension. Fig. 2 is a modification of Fig. 1; Fig. 3 shows this invention applied to the damping of an electromagnetic receiver; Fig. 4 illustrates how a carbon button may be employed for damping an electromagnetic receiver; Fig. 5 illustrates how a variable capacity may be employed to furnish the electromotive force for damping a vibratory system; Fig. 6 illustrates this invention applied to one type of phonograph recorder; Fig. 7 is another modification of Fig. 1 as applied to an oscillograph suspension; and Fig. 8 shows how a telephone transmitter may be damped in accordance with this invention.

Referring to Fig. 1, an incoming line 9 is disclosed in which it is assumed electric currents are present which are to be amplified by a suitable amplifier 10 and impressed upon an oscillograph suspension 11, whereby the usual beam of light reflected by the mirror 12 will be deflected in the well-known manner in accordance with the incoming currents.

As is well-known in the art, the response of an oscillograph suspension is dependent, to some extent, upon the frequency of the incoming currents, and an oscillograph suspension in general will have a natural resonance effect for a certain frequency or band of frequencies whereby currents of the frequencies at or near the resonating frequency are unduly emphasized and transients are produced. The arrangement shown in Fig. 1 illustrates one way in which this invention may be employed for damping the oscillations of the oscillograph whereby this resonating effect is substantially avoided.

Line 9 is connected in series with the oscillograph suspension 11, through a resistance 13, which for reasons given later, should have a resistance approximately equal to the resistance of the suspension 11. Terminal 14 of the suspension is connected to the cathode, and terminal 15 to the control electrode of a vacuum tube amplifier 16, while that terminal of resistance 13 adjacent the oscillograph is connected to the control electrode, and the other terminal of the resistance 13 to the cathode of a second vacuum tube amplifier 17. The anode 18 of tube 16 is connected to the cathode by a circuit including a source of voltage 19 and a resistance 20, while anode 21 of tube 17 is connected to its cathode by a circuit including a source of voltage 22 and a resistance 23. Assuming that tubes 16 and 17 are identical with respect to impedance and operating characteristics, resistances 20 and 23 should be of equal values. The outside terminals of resistances 20 and 23 are connected through a phase shifting network comprising inductances 24, 25 and 26, condensers 27 and 28 and leads 29 and 30, back to the line 9 between the amplifier 10 and the oscillograph.

With the apparatus connected as above described, the control electrode of tube 16 will have impressed thereon a potential having two components, one proportional to the velocity of the suspension 11, due to the fact that the oscillograph suspension 11 is vibrating in a magnetic field therefore produces an E. M. F. proportional to its velocity and the second proportional to the resistance drop in the oscillograph loop. This potential due to the first component impressed on the control electrode of tube 16 will produce a variation in the space current flowing through resistance 20 and this variation in the potential drop across the terminals of resistance 20, after being shifted in phase, will be impressed back on circuit 9 by means of leads 29 and 30. This current will be proportional to the velocity of vibration of the oscillograph loop. The inductances 24, 25 and 26 and condensers 27 and 28 should be adjusted to produce such a change in the phase of the potentials amplified by tube 16 that they are fed back upon circuit 9, 180° out of phase with the potentials in circuit 9 which produced the original vibration of the suspension 11. Leads 29 and 30 will therefore feed back upon the oscillograph suspension, current proportional to, but 180° out of phase with the velocity of suspension 11, and a damping of the vibration of the suspension will consequently result. This, of course, will substantially reduce, if not entirely eliminate, the resonance effect of the suspension for certain frequencies, since when the frequencies near the resonance point are impressed thereon thereby tending to produce an abnormal deflection of the oscillograph, currents proportional to, but 180° out of phase with the abnormal deflection will be fed back by leads 29 and 30 so that the oscillograph is prevented from over-emphasizing the resonating frequencies.

In some cases it will be desirable to prevent the feed-back circuit from being directly responsive to the electric potentials impressed on the oscillograph, the so-called second component mentioned above. As shown in Fig. 1, resistance 13 being equal to the resistance of oscillograph 11, the control electrode of tube 16, for example, will be made positive with respect to its cathode due to the currents in line 9, an amount numerically equal to the potential difference which makes control electrode of tube 17 negative with respect to its cathode. A similar observation of course would apply when the potentials in line 9 were of such a character as to make the control electrode of tube 16 negative and that of tube 17 positive. Making the control electrode of tube 16 positive will increase the current in resistance 20, and making the potential on the control electrode of tube 17 negative will decrease the current flow through resistance 23. Since tubes 16 and 17 are identical and resistances 20 and 23 are equal, it follows that the potential difference developed across the terminals of resistance 20 will be equal and opposite of the potential developed across the terminals of resistance 23, so that the original electric potentials in line 9 impressed upon tubes 16 and 17 will not be fed back by leads 29 and 30, due to the balanced relations of tubes 16 and 17. This balanced relation, however, does not interfere with the feeding-back into the circuit 9 of amplified potentials proportional to the potentials developed by the vibration of the suspension 11 in the usual magnetic field.

The phase shifting network comprising series adjustable inductances 24, 25 and 26 and shunt adjustable condensers 27 and 28 is merely illustrative of one form, the phase shifting network may have, and it is to be understood that various types of phase shifting networks may be employed as is well-known in the art for producing a desired phase displacement over a desired frequency range. A network of a plurality of recurring sections such as shown in Fig. 1, will be found particularly useful when it is desired to produce the same phase shift over a wide frequency range, for example, the range of frequencies of importance in speech.

It is to be understood, of course, that the amount of amplification produced by tube 16 depends upon the amount of damping desired, and the amplification, of course, may be readily adjusted to give high amplification for high damping, or low amplification for low damping. The amplifier may furthermore be adjusted to give either under-compensation or over-compensation in addition to an exact compensation.

Fig. 2 is a modification of Fig. 1, and is similar thereto, in that the incoming line 32 is assumed to contain electric currents which are to be impressed upon an oscillograph suspension 33. Line 32 is connected to the oscillograph through a transformer 34, and a resistance 35 is connected in series with the line and the primary winding of transformer 34. The terminals 36 and 37 of a suitable phase shifting network 38 have impressed thereon potentials proportional to the IR drop in suspension 33 and in resistance 35. As transformer 34 may be designed to give a phase shift of 180° for the potentials present in line 32, the IR drop in suspension 33, due to these potentials will be equal and opposite in phase to the IR drop in resistance 35, providing resistance 35 is of the same value as the resistance of suspension 33. A vacuum tube amplifier 39, which is coupled to the phase shifter through a suitable input transformer 40 will therefore have impressed thereon none of the original potentials present in line 32 because of the phase shift produced by the transformer 34. The amplifier, however, will be responsive to the potentials developed in suspension 33, due to its deflection in the magnetic field, so that the phase shifter 38 and the amplifier 39 may be adjusted so that leads 41 and 42 will impress back on circuit 32 potentials proportional to and in phase with the velocity of the suspension. This fed-back potential will then be changed 180° in phase by transformer 34 and cause the damping of the vibration of the suspension in the manner described above.

Fig. 3 illustrates an electro-magnetic receiver having a diaphragm 45 attached to a pivoted armature 46 suitably located between the poles of magnet 47. The armature 46 is surrounded by coils 48 and 49 which are connected to an incoming circuit 50, a telephone circuit, for example, and incoming currents from line 50 will therefore cause the armature 46 to vibrate, thereby producing the vibration of the diaphragm 45, whereby the currents present in line 50 are translated into sound waves. In order to prevent the diaphragm 45 from over emphasizing frequencies in line 50 which are at or near the resonating frequency of the diaphragm, the damping mechanism of this invention is provided. The reed 51, which serves to connect armature 46 to the diaphragm 45 is employed as an armature for the electromagnet 52, whereby the moving of the reed 51 towards and away from the poles of the electromagnet 52, causes a variable current to be produced in the coil 53 surrounding the electromagnet and these variable currents, by a transformer 54, may be impressed upon a suitable amplifier and phase shifter 55, whereby the variable currents are amplified to the desired amount and shifted in phase to such an extent that the variable currents impressed by transformer 56 upon line 50 produce forces proportional to, but 180° out of phase with the velocity of the diaphragm 45. The telephone diaphragm 45 will therefore be damped, an amount depending upon the amplification of the variable currents developed by coil 53. Diaphragm 45 may therefore be made to have a substantially constant response over a wide range of frequencies, for example, the range of frequency of importance in speech and music.

It is particularly advantageous to employ vacuum tubes in connection with this invention since tubes of the type disclosed are unidirectional devices and for example will not permit the potentials in line 50 from actuating armature 51 through the electromagnet 52.

Fig. 4 is similar to Fig. 3, in that a telephone receiver is disclosed, having a diaphragm 60 connected to a pivoted armature 61, which is oscillated in accordance with currents present in an incoming line 62. The reed 63, however, which serves to connect the armature 61 to the diaphragm 60 is attached to a diaphragm 64 of a carbon button 65, whereby the vibration of the reed 63 varies the pressure exerted on the carbon granules in a well known manner, thereby producing variations in the current flowing therethrough due to its battery 66. The amplifier and phase shifter 67 will therefore receive potentials proportional to the vibration of reed 63 and consequently the amplifier and phase shifter may be suitably adjusted to impress upon line 62 currents which will produce forces proportional to but 180° out of phase with the velocity of diaphragm 60, whereby the diaphragm 60 may be made to have a substantially constant response over a wide frequency range.

Fig. 5 is similar to Fig. 4 in that an electromagnetic receiver is disclosed, and the reed 70 which connects the pivoted armature to the diaphragm 71 is suitably attached to the movable plate 72 of a condenser transmitter 73. The two terminals of condenser 73 are charged by a battery 74 and consequently the vibration of the movable plate 72 will produce potentials which may be amplified and shifted in phase by a device 75 to such an extent that the diaphragm 71 has a substantially constant response over a wide frequency range.

This invention, of course, is not limited to the electrical damping of telephone receivers and oscillographs, but may be applied to other types of mechanically vibratory systems. In Fig. 6, for example, is shown one way in which a phonographic recorder may be damped in accordance with this invention. The incoming line 80 is connected in circuit with two electric coils 81 and 82, which surround a pivoted armature 83, and is adapted to oscillate between the poles of electromagnet 84. One end of the pivoted armature 83 may be suitably terminated by a phonograph needle 85, which may be employed, for example, in cutting a sound record corresponding to the signals or messages present in line 80. The winding 86 of the electromagnet is energized by a suitable source of voltage 87. Member 88 is an auxiliary armature carried by the armature 83 of the vibrating system, and is so placed between the poles of the electromagnet 84, to modulate the inductance of the magnetizing coil 86, as to neither influence nor be influenced appreciably by the alternating currents from line 80 which drive the vibrating system. The variable inductance of the magnetizing winding 86 produced by the recurring vibration of the auxiliary armature 88 will cause variable potentials to be impressed upon the amplifier and phase shifter 89, which arrangement may be adjusted so that potentials will be impressed on line 80 which will produce forces proportional to, but 180° out of phase with the velocity of the vibrating system whereby the desired damping of the vibrating system may be produced and resonating effects eliminated.

Fig. 7 is a modification of Fig. 2, operating in a similar manner for damping the vibration of the oscillograph suspension 90, with the exception that the amplifier employed for amplifying the currents generated by the oscillograph, is the same amplifier as is employed for amplifying the original currents. A telephone transmitter 91 is shown, the currents from which are impressed upon a suitable amplifier 92, through a potentiometer 93 and by a transformer 94 upon the oscillograph. The potentials generated by the oscillograph are shifted in phase by the phase shifter 95 and impressed upon an adjustable portion of the potentiometer 93 included between leads 96 and 97, whereby the currents fed back will be amplified to the desired degree by amplifier 92. The operation of the system in other respects is the same as in Fig. 2. Resistance 98 should, of course, be equal to the resistance of the oscillograph suspension 90.

Fig. 8 discloses how this invention may be applied to produce the electrical damping of a telephone transmitter. A telephone transmitter diaphragm 99 is disclosed, which by a member 100 is suitably connected to a carbon button 101 to vary the pressure exerted on the carbon granules in the same manner as in the well known type of microphone transmitter whereby the sound waves impressed upon the diaphragm 99 will be translated into electric currents in line 102. In order to insure that the response of the telephone diaphragm 99 will be substantially constant over a wide frequency range, a small armature 103 is attached to one side of the diaphragm 99 opposite the poles of an electromagnet 104. The coils surrounding the electromagnet 104 are connected to the input terminals of a vacuum tube amplifier 105, the output terminals of which, through a suitable phase shifter 106 are connected to an electric coil 107 of an electromagnet 108 for which the diaphragm 99 constitutes an armature. The vibration of the diaphragm 99, due to impressed sound waves, will therefore cause the variable potentials developed in the coils of magnet 104 to be impressed upon amplifier 105, and these variable potentials, after amplification, may be suitably shifted in phase by the phase shifter until the force exerted by the coil 107 on the diaphragm is proportionate to, but 180° out of phase with the vibration of the diaphragm caused by the impressed sound waves. The microphone transmitter, may therefore be damped to correct for any unequal response, the transmitter may have for impressed sound waves of various frequencies.

It is to be understood that this invention is of wide application, and is capable of embodiments widely different from those described in detail above, without departing in anywise from the spirit of this invention as defined in the appended claims.

What is claimed is:

1. A mechanical vibratory system, subjected to a force for vibrating said system, means for producing electrically a force proportional to the velocity of said system, and phase controlling means for causing said force to control the movement of said vibratory system.

2. In a mechanical vibratory system subjected to a force for vibrating said system, means for producing an eletromotive force proportional to the velocity, means for shifting the phase of said electromotive force, and means for causing said phase shifted electromotive force to produce a mechanical force which damps the vibrations of the mechanical system.

3. In a mechanical vibratory system subjected to a force for vibrating said system, means for producing an electromotive force proportional to the velocity of the vibrations of said system and means for causing the electromotive force to produce a force which is approximately 180° out of phase with the velocity of the vibrating system to damp the vibrations of said system, said last named means comprising unidirectional conducting and phase shifting means.

4. A mechanical vibratory system subjected to a force for vibrating said system, means for producing an electromotive force proportional to the velocity of the vibrations of said system, means for amplifying the electromotive force produced, means for shifting the phase of the amplified electromotive force, and means for causing the amplified and phase-shifted electromotive force to produce a mechanical force which is approximately 180° out of phase with the velocity of the vibrating system and which thereby damps the vibrations of said system.

5. A mechanical vibratory system having a natural period within the voice frequency range, an electric circuit, means for causing the currents in said circuit to produce corresponding vibrations of said system, and means for damping said mechanical system, said damping means comprising means for producing electrical current proportional to, but approximately 180° out of phase with the velocity of said mechanical system, and means for impressing said produced current upon said circuit whereby the said produced current opposes the action of said electric currents on said system.

6. In combination, a magnet, a pivoted armature for said magnet, a coil surrounding said armature, means for impressing currents on said coil to cause the vibration of said armature, an auxiliary electromagnet having pole pieces cooperating with said armature, an energizing winding surrounding said electromagnet, a source of voltage connected to said winding, means for amplifying the current variations produced in said winding by the movement of said armature, and means for impressing the amplified currents upon said coil in such a way as to oppose the original currents producing the vibration of said armature.

7. In combination, a magnet, a pivoted armature for said magnet, a coil surrounding said armature, an electric circuit connected to said coil, means for producing current variations proportional to the vibrations of said armature, a uni-directional device for amplifying said variations, and means for impressing said amplified current variations upon said circuit in such a manner that the force produced by the impressed currents is approximately 180° out of phase with the velocity of said armature.

8. In combination, a magnet, a pivoted armature for said magnet, a coil surrounding said armature, an electric circuit connected to said coil, an electromagnet having its pole pieces cooperating with said armature, an energizing winding surrounding said electromagnet, a source of voltage connected to said winding, a vacuum tube amplifier, having its input terminals responsive to the current variations produced in said winding by the vibration of said armature, connections between the output terminals of said amplifier and said circuit, and means for causing the currents received by said circuit from said amplifier to produce a force on said armature approximately 180° out of phase with the velocity of said armature.

9. A mechanical vibratory system, an electric circuit, means for causing the current in said circuit to produce corresponding vibrations of said system and means for damping said mechanical system, said damping means comprising means for producing an electrical current proportional to the velocity of said mechanical system, phase shifting means and unidirectional conducting means for impressing said produced current upon said circuit whereby said produced current opposes the action of said first mentioned electrical current on said system.

10. A mechanical vibratory system, an electric circuit, means for causing the current in said circuit to produce corresponding vibrations in said system and means for damping said mechanical system, said damping means comprising means for producing electrical current proportional to the vibrations in said mechanical system, means for amplifying and shifting the phase of said produced current and means for impressing said amplified and phase shifted current upon said circuit whereby it opposes the action of said first mentioned electrical current on said mechanical system.

In witness whereof, we hereunto subscribe our names this 28th day of December, A. D., 1922.

JOSEPH P. MAXFIELD.
HENRY C. HARRISON.